(12) United States Patent
Tsuchiya et al.

(10) Patent No.: US 11,420,277 B2
(45) Date of Patent: Aug. 23, 2022

(54) WIRE ELECTRICAL DISCHARGE MACHINE AND CONTROL METHOD OF WIRE ELECTRICAL DISCHARGE MACHINE

(71) Applicant: FANUC CORPORATION, Yamanashi (JP)

(72) Inventors: Yousuke Tsuchiya, Yamanashi-ken (JP); Tomoyuki Furuta, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 284 days.

(21) Appl. No.: 16/724,763

(22) Filed: Dec. 23, 2019

(65) Prior Publication Data

US 2020/0198037 A1 Jun. 25, 2020

(30) Foreign Application Priority Data

Dec. 25, 2018 (JP) .............................. JP2018-240687

(51) Int. Cl.
*B23H 1/02* (2006.01)
*B23H 7/10* (2006.01)

(52) U.S. Cl.
CPC .............. *B23H 1/028* (2013.01); *B23H 7/10* (2013.01)

(58) Field of Classification Search
CPC . B23H 1/024; B23H 7/04; B23H 1/02; B23H 1/028
See application file for complete search history.

(56) References Cited

U.S. PATENT DOCUMENTS 3,705,286 A 12/1972 Kondo et al.
7,045,735 B2 5/2006 Satou et al.
(Continued)

FOREIGN PATENT DOCUMENTS

JP 57075730 A * 5/1982 ............. B23H 1/024
JP 59019633 A * 2/1984 ............... B23H 7/04
(Continued)

OTHER PUBLICATIONS

English Abstract and Machine Translation for Japanese Publication No. 2017-013151 A published Jan. 19, 2017, 8 pgs.
(Continued)

*Primary Examiner* — Geoffrey S Evans
(74) *Attorney, Agent, or Firm* — Fredrikson & Byron, P.A.

(57) ABSTRACT

A wire electrical discharge machine for machining a workpiece by generating electric discharge at a discharge gap between the workpiece and a wire electrode includes: a machining current setting unit for setting the magnitude of a normal machining current depending on the discharge gap state at application of a discharge induction voltage at the previous time or previous times; and a machining current control unit configured to control a main discharge circuit so as to supply the normal machining current to the discharge gap when the present discharge gap state is the normal state, control the main discharge circuit so as to supply a short-circuit machining current smaller than a predetermined current to the gap when the discharge gap state is the short-circuited state, and control the main discharge circuit so as not to supply any machining current to the gap when the discharge gap state is the open state.

11 Claims, 10 Drawing Sheets

(56) References Cited

U.S. PATENT DOCUMENTS

2008/0110865 A1\* 5/2008 Hashimoto .............. B23H 7/04
219/69.12
2017/0297126 A1\* 10/2017 Yoda ........................ B23H 7/04

FOREIGN PATENT DOCUMENTS

| JP | 03035936 A | \* | 2/1991 |
|----|------------|---|--------|
| JP | 2016196078 A | | 11/2016 |
| JP | 201713151 A | | 1/2017 |
| TW | 200819231 A | | 5/2008 |

OTHER PUBLICATIONS

English Abstract and Machine Translation for Japanese Publication No. 2016-196078 A, published Nov. 24, 2017, 12 pgs.
English Abstract and Machine Translation for Taiwanese Publication No. TW200819231A, published May 1, 2008, 29 pgs.
Extended European Search Report for European Patent Application No. 19217788.9, dated Jun. 4, 2020, 10 pgs.

\* cited by examiner

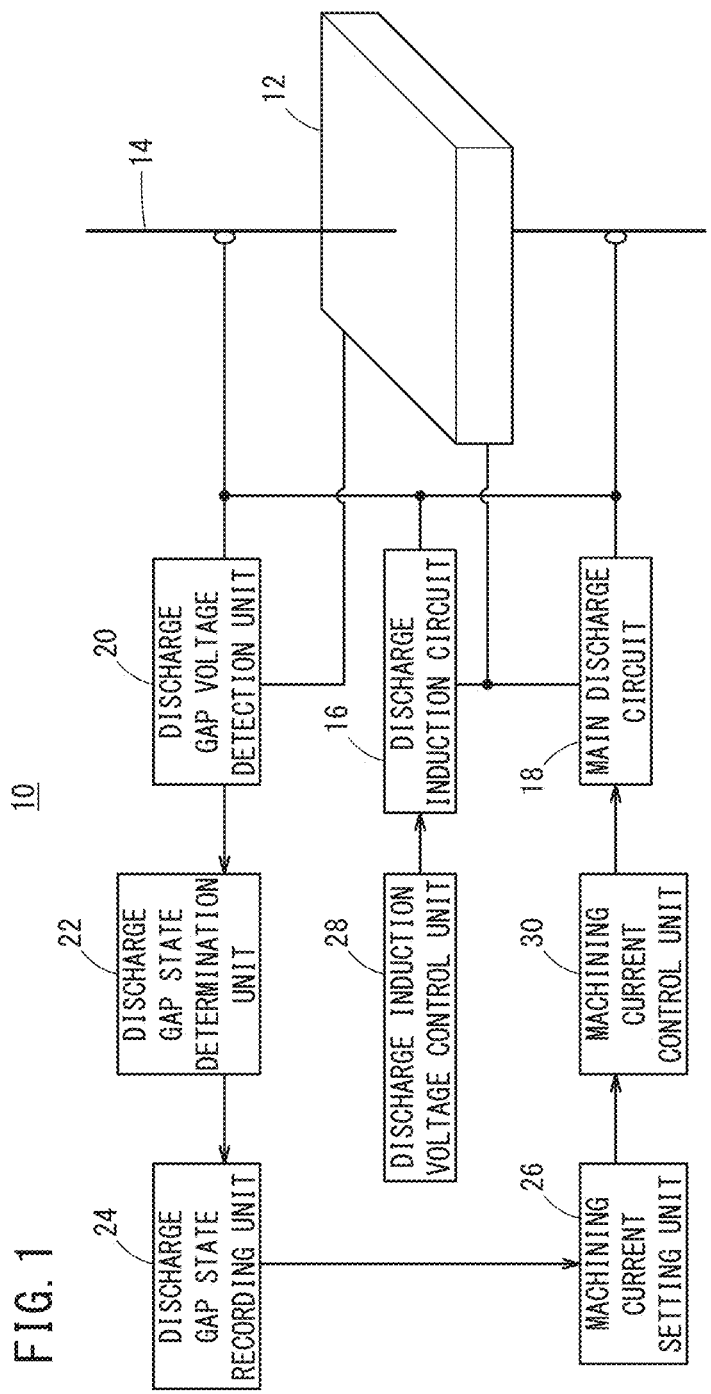

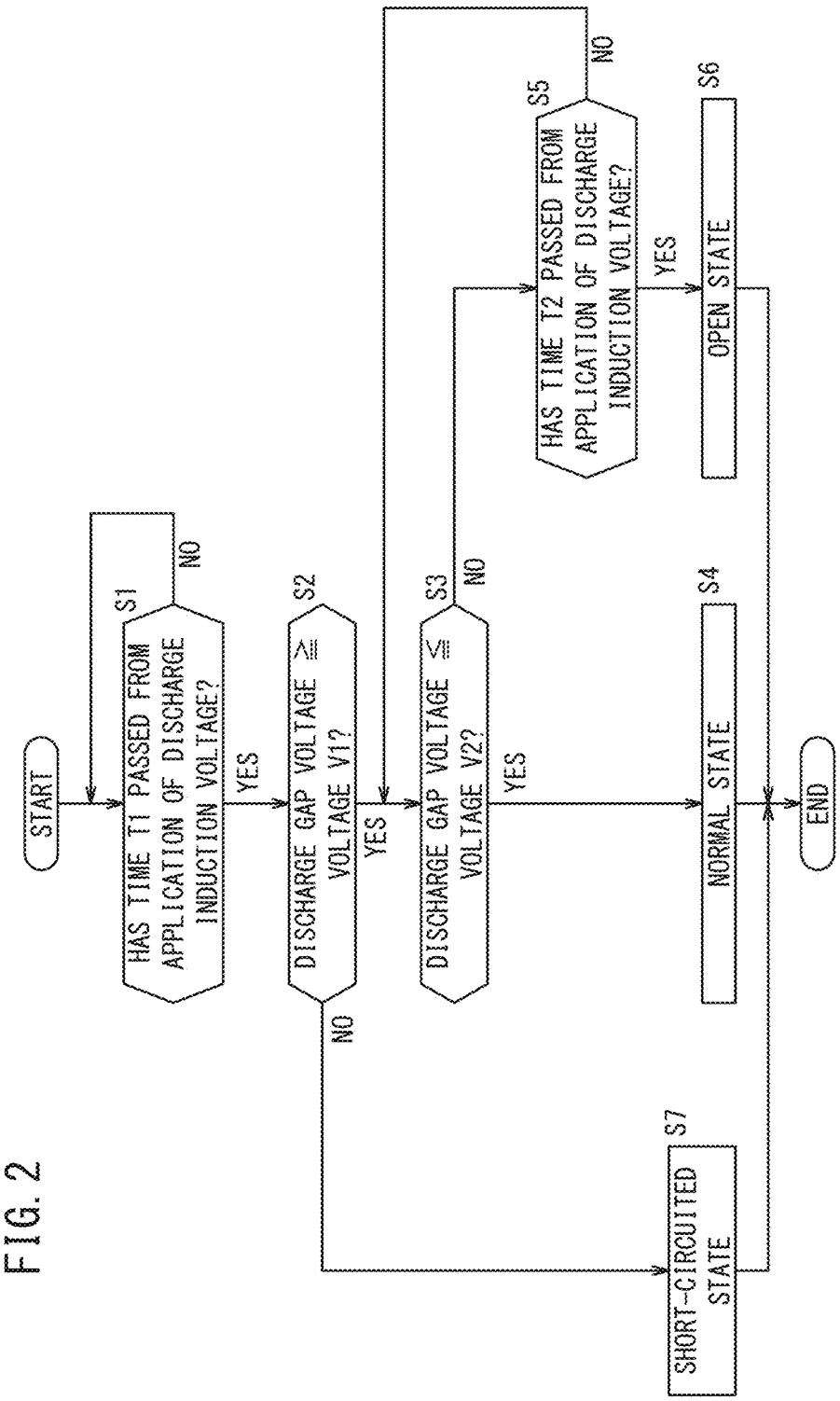

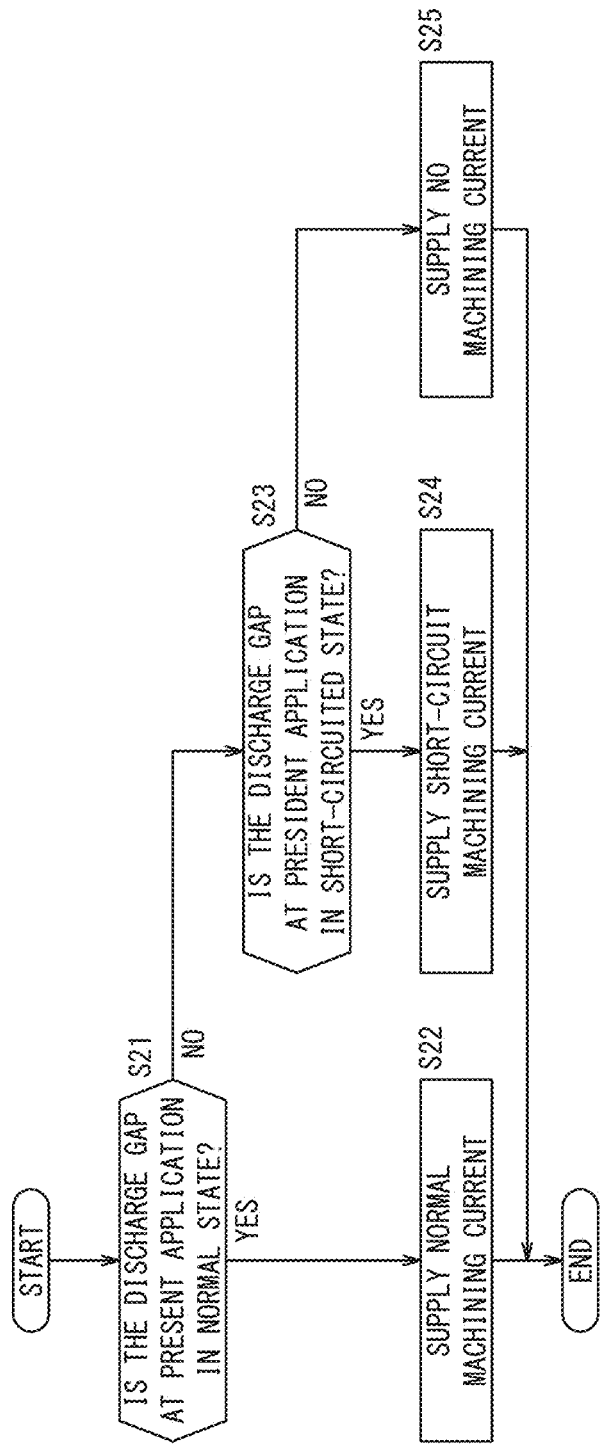

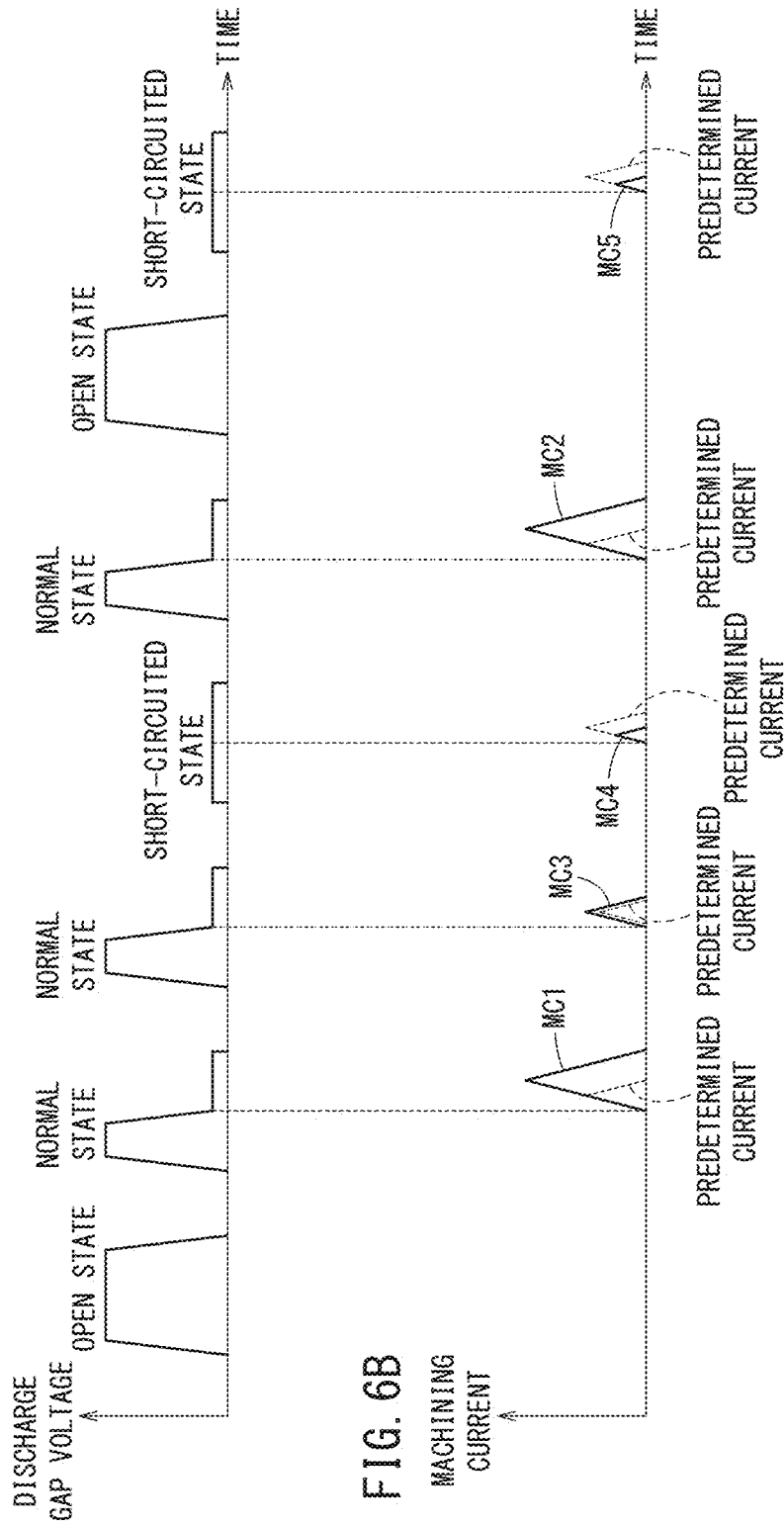

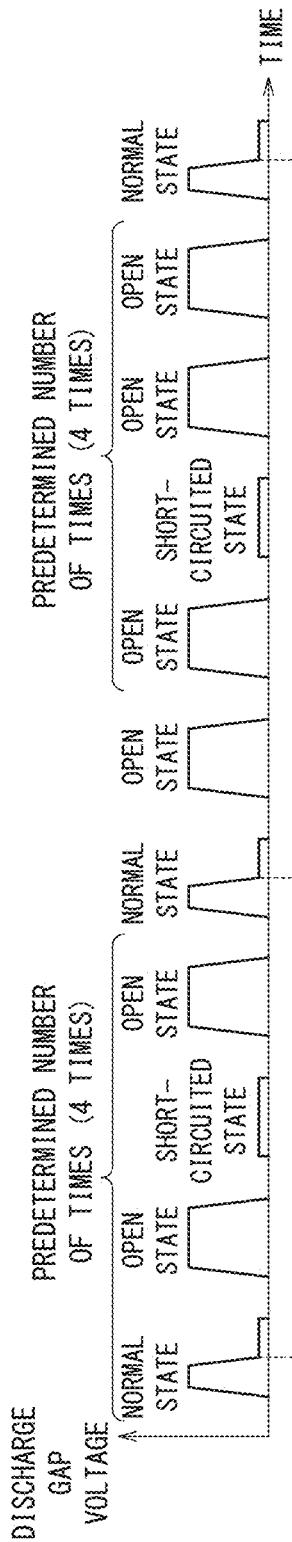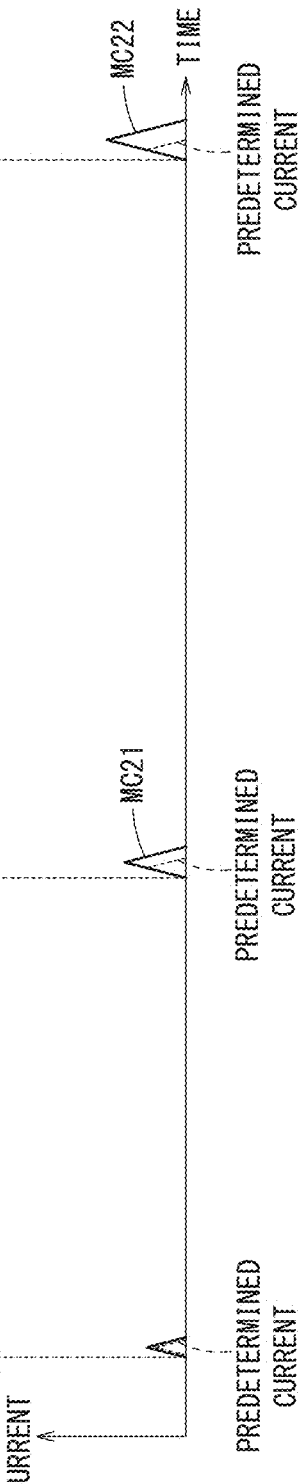

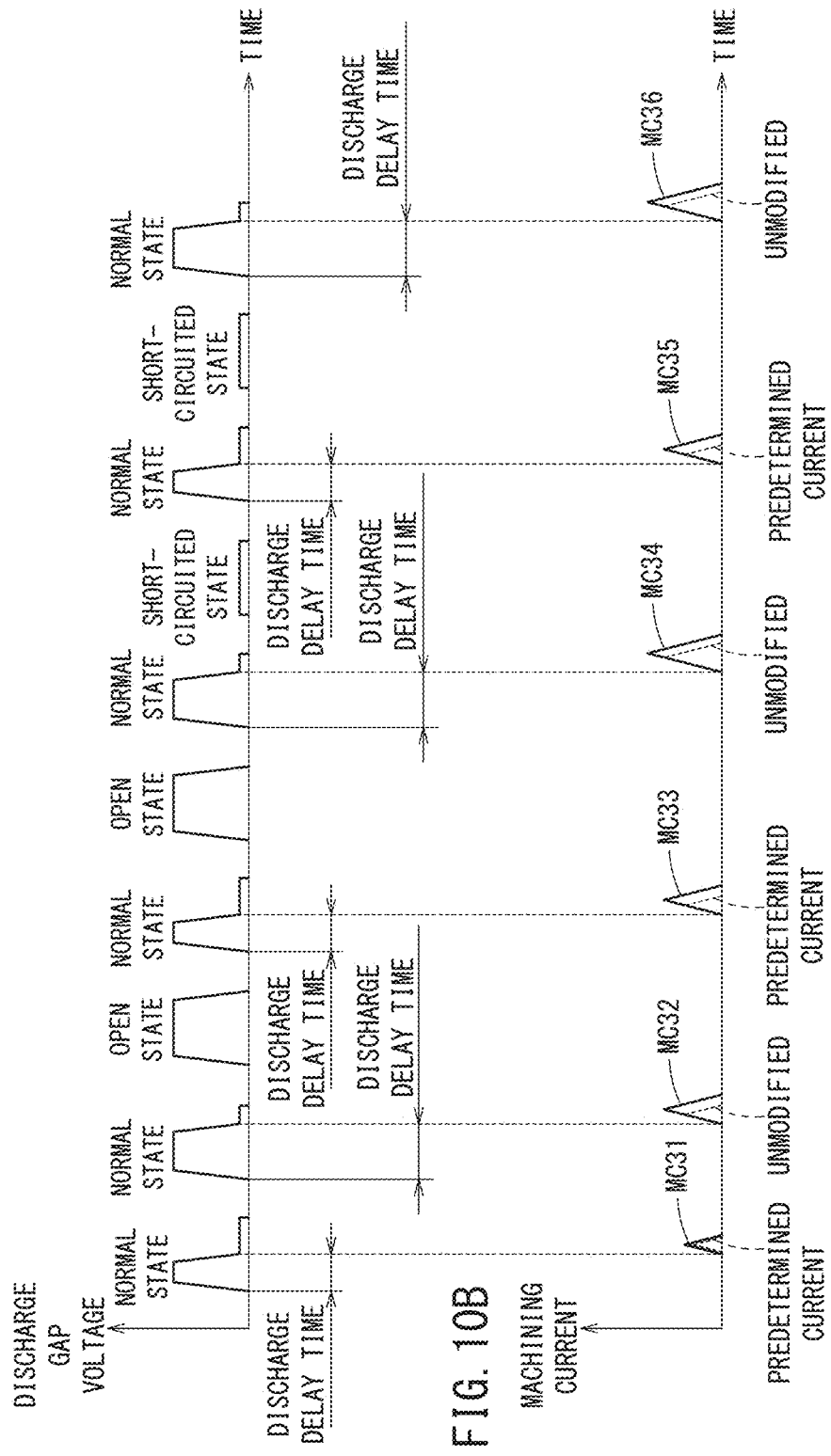

WIRE ELECTRICAL DISCHARGE MACHINE AND CONTROL METHOD OF WIRE ELECTRICAL DISCHARGE MACHINE

CROSS-REFERENCE TO RELATED APPLICATION

This application is based upon and claims the benefit of priority from Japanese Patent Application No. 2018-240687 filed on Dec. 25, 2018, the contents of which are incorporated herein by reference.

BACKGROUND OF THE INVENTION

Field of the Invention

The present invention relates to a wire electrical discharge machine for machining a workpiece by generating sparks in a discharge gap between the workpiece and a wire electrode, as well as relating to a control method of controlling the wire electrical discharge machine.

Description of the Related Art

Japanese Laid-Open Patent Publication No. 2017-013151 discloses a wire electrical discharge machine.

SUMMARY OF THE INVENTION

In the wire electrical discharge machine disclosed in Japanese Laid-Open Patent Publication No. 2017-013151, the machining speed can be enhanced as the machining current is increased. However, if the machining current is too large, there occurs a problem that the wire electrode frequently breaks.

The present invention has been devised to solve the above-described problem, it is therefore an object of the present invention to provide a wire electrical discharge machine that can set up a machining current for enhancing the machining speed while suppressing breakage of the wire electrode, as well as providing a method of controlling the wire electrical discharge machine.

A first aspect of the present invention resides in a wire electrical discharge machine for machining a workpiece by generating electric discharge at a discharge gap between the workpiece and a wire electrode, including: a discharge induction circuit configured to apply a discharge induction voltage across the discharge gap; a main discharge circuit configured to supply machining current to the discharge gap; a discharge gap state determination unit configured to determine which state the discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on the voltage across the discharge gap when the discharge induction voltage is applied across the discharge gap; a discharge gap state recording unit configured to record at least one of the normal state, the short-circuited state and the open state as the discharge gap state; a machining current setting unit configured to set a magnitude of a normal machining current depending on the discharge gap state that occurred when the discharge induction voltage was applied to the discharge gap at the previous time or previous times; and a machining current control unit configured to control the main discharge circuit so as to supply the normal machining current to the discharge gap when the discharge gap state at the present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state.

A second aspect of the present invention resides in a control method of controlling a wire electrical discharge machine machining a workpiece by generating electric discharge at a discharge gap between the workpiece and a wire electrode. The wire electrical discharge machine includes: a discharge induction circuit configured to apply a discharge induction voltage across the discharge gap; and a main discharge circuit configured to supply machining current to the discharge gap. The control method includes: a discharge gap state determining step of determining which state the discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on the voltage across the discharge gap when the discharge induction voltage is applied across the discharge gap; a discharge gap state recording step of recording at least one of the normal state, the short-circuited state and the open state as the discharge gap state; a machining current setting step of setting a magnitude of a normal machining current depending on the discharge gap state that occurred when the discharge induction voltage was applied to the discharge gap at the previous time or previous times; and a machining current controlling step of controlling the main discharge circuit so as to supply the normal machining current to the discharge gap when the discharge gap state at a present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state.

According to the present invention, it is possible to set a machining current that can enhance the machining speed while suppressing breakage of the wire electrode.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a configuration diagram of a wire electrical discharge machine;

FIG. 2 is a flowchart showing a discharge gap state determination process performed in a discharge gap state determination unit;

FIG. 5 is a flowchart showing a machining current control process performed in a machining current control unit;

FIG. 6A is a time chart of discharge gap voltage, and FIG. 6B is a time chart of machining current;

FIG. 9A is a time chart of discharge gap voltage, and FIG. 9B is a time chart of machining current; and FIG. 10A is a time chart of discharge gap voltage, and FIG. 10B is a time chart of machining current.

DESCRIPTION OF THE PREFERRED EMBODIMENTS

First Embodiment

Configuration of Wire Electrical Discharge Machine

Figure 3A:
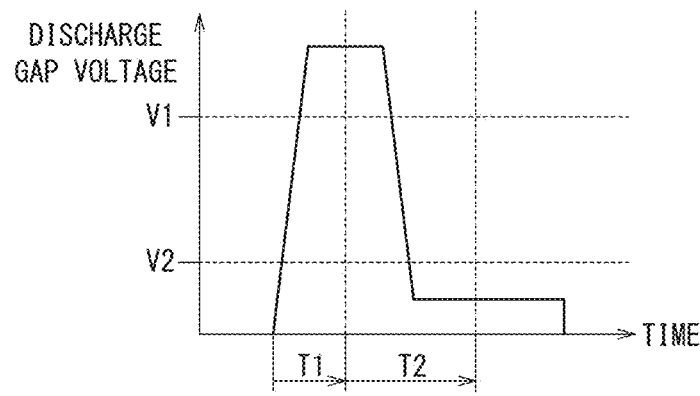
FIGS. 3A, 3B and 3C are diagrams showing waveforms of the discharge gap voltage for each discharge gap state.

FIG. 1 is a configuration diagram of a wire electrical discharge machine 10. The wire electrical discharge machine 10 machines a workpiece 12 by generating discharge sparks at the discharge gap between the workpiece 12 and a wire electrode 14.

The wire electrical discharge machine 10 includes a discharge induction circuit 16 that applies a discharge induction voltage across the discharge gap, a main discharge circuit 18 that supplies machining current to the discharge gap, an discharge gap voltage detection unit 20 that detects the discharge gap voltage, a discharge gap state determination unit 22 that determines the state of the discharge gap (discharge gap state) based on the discharge gap voltage, a discharge gap state recording unit 24 that records the determined discharge gap state, a machining current setting unit 26 that sets the magnitude of the machining current based on information on the past discharge gap state, a discharge induction voltage control unit 28 that controls the discharge induction circuit 16 so as to apply a discharge induction voltage across the discharge gap, and a machining current control unit 30 that causes the main discharge circuit 18 to supply machining current to the discharge gap.

The discharge induction circuit 16 applies a discharge induction voltage across the discharge gap to thereby generate discharge (spark) across the discharge gap.

The main discharge circuit 18 supplies machining current for machining the workpiece 12 after a discharge spark has been generated at the discharge gap.

The discharge gap voltage detection unit 20 detects the voltage (discharge gap voltage) between the workpiece 12 and the wire electrode 14 when discharge induction voltage is applied across the discharge gap.

The discharge gap state determination unit 22 determines the discharge gap state (i.e., which state the discharge gap is in) when discharge induction voltage is applied across the discharge gap, based on the discharge gap voltage generated when discharge induction voltage is applied to the discharge gap. The discharge gap state can be classified into three states, namely a normal state in which electric discharge is generated in the discharge gap, a short-circuited state in which short-circuiting occurs as a result of contact between the workpiece 12 and the wire electrode 14 or as a result of retention or stagnation of chips between the workpiece 12 and the wire electrode 14, and an open state in which no current flows through the discharge gap. The discharge gap state determination process in the discharge gap state determination unit 22 will be detailed later.

The discharge gap state recording unit 24 records the discharge gap state determined by the discharge gap state determination unit 22 every time a discharge induction voltage is applied to the discharge gap.

The machining current setting unit 26 sets the magnitude of an aftermentioned normal machining current, based on the discharge gap state that occurred when the discharge induction voltage was previously applied across the discharge gap. The discharge gap state at the previous time (i.e., at previous application of a discharge induction voltage to the disgorge gap) is recorded in the discharge gap state recording unit 24. The machining current setting process in the machining current setting unit 26 will be described in detail later.

The discharge induction voltage control unit 28 controls the discharge induction circuit 16 so as to apply a discharge induction voltage having a predetermined voltage to the discharge gap at a predetermined cycle.

The machining current control unit 30 controls the main discharge circuit 18 so as to supply a normal machining current as the machining current to the discharge gap, or so as to supply a short-circuit machining current as the machining current to the discharge gap, or so as not to supply the machining current to the discharge gap, depending on the discharge gap state that occurred at the present application of a discharge induction voltage to the discharge gap. The machining current control process in the machining current control unit 30 will be detailed later.

Discharge Gap State Determination Process

FIG. 2 is a flowchart showing a discharge gap state determination process performed in the discharge gap state determination unit 22. The discharge gap state determination process is performed while the discharge induction voltage is being applied across the discharge gap.

At step S1, the discharge gap state determination unit 22 determines whether or not a time T1 has passed since a discharge induction voltage was applied to the discharge gap. When the time T1 has elapsed, the process proceeds to step S2, and when the time T1 has not passed, the process of step S1 is repeated.

At step S2, the discharge gap state determination unit 22 determines whether or not the discharge gap voltage is equal to or higher than a voltage V1 (i.e., whether the discharge gap voltage≥V1). When the voltage across the discharge gap is equal to or higher than the voltage V1, the process goes to step S3. When the voltage across the discharge gap is less than the voltage V1, the process goes to step S7.

At step S3, the discharge gap state determination unit 22 determines whether the discharge gap voltage is equal to or lower than a voltage V2 (i.e., whether the discharge gap voltage≤V2). When the voltage across the discharge gap is equal to or lower than the voltage V2, the process proceeds to step S4. When the voltage across the discharge gap is greater than the voltage V2, the process goes to step S5.

At step S4, the discharge gap state determination unit 22 determines that the discharge gap state is in the normal state, and ends the discharge gap state determination process.

At step S5, the discharge gap state determination unit 22 determines whether or not a time T2 has passed since a discharge induction voltage was applied to the discharge gap. When the time T2 has passed, the process goes to step S6, and when the time T2 has not passed, the process returns to step S3.

At step S6, the discharge gap state determination unit 22 determines that the discharge gap state is in the open state, and ends the discharge gap state determination process.

At step S7, the discharge gap state determination unit 22 determines that the discharge gap state is in the short-circuited state, and ends the discharge gap state determination process.

Waveform of Discharge Gap Voltage for Each Discharge Gap State

Figure 3B:
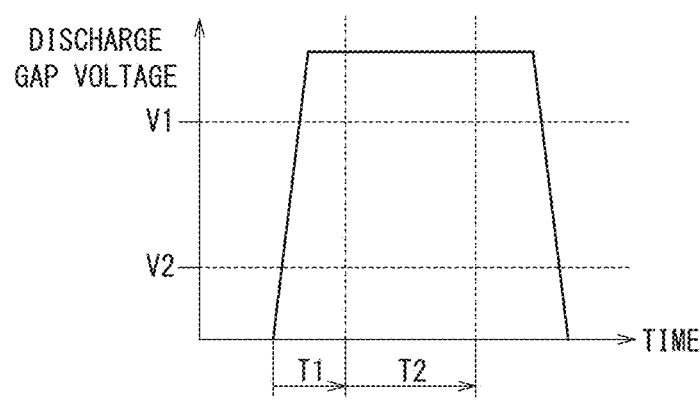
Figure 3C:
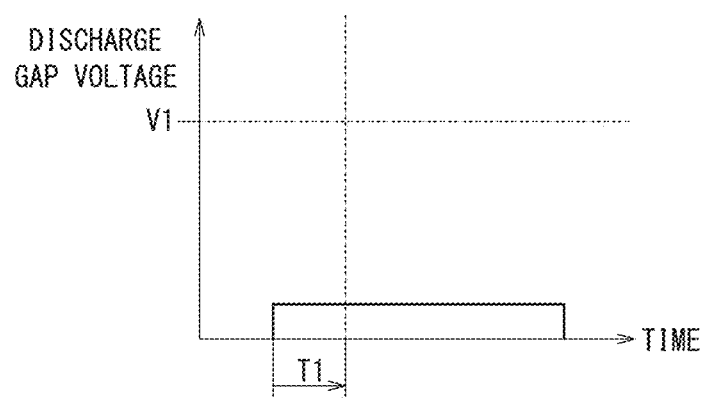

FIGS. 3A, 3B and 3C are diagrams showing waveforms of the discharge gap voltage for each discharge gap state. FIG. 3A shows a waveform of the discharge gap voltage in the normal state. FIG. 3B shows the waveform of the discharge gap voltage in the open state. FIG. 3C shows a waveform of the discharge gap voltage in the short-circuited state.

First, the waveform of the discharge gap voltage in the normal state will be described. In the normal state, a discharge gap has an appropriate width immediately before application of a discharge induction voltage. The discharge gap is filled with a dielectric working fluid, so that the discharge gap is in an insulated state. At this time, when a discharge induction voltage is applied, the discharge gap voltage increases, and the discharge gap voltage becomes equal to or higher than the voltage V1 as shown in FIG. 3A. Thereafter, as the wire electrode 14 approaches the workpiece 12 and the discharge gap becomes smaller accordingly, the insulation at the discharge gap is broken and generation of a discharge spark is started, so that the wire electrode 14 and the workpiece 12 are electrically connected. As a result, the discharge gap voltage decreases and becomes equal to or lower than the voltage V2 (V2<V1) as shown in FIG. 3A. Thus, when the voltage across the discharge gap after a lapse of the time T1 from when the discharge induction voltage was applied to the discharge gap is equal to or higher than the voltage V1, and when the voltage across the discharge gap becomes equal to or lower than the voltage V2 before elapse of the time T2, it is determined that a discharge has occurred across the discharge gap and the discharge gap is in the normal state.

Next, the waveform of the discharge gap voltage in the open state will be described. In the open state, the discharge gap is wider than that in the normal state immediately before application of a discharge induction voltage. Therefore, even when the wire electrode 14 approaches the workpiece 12, the discharge gap does not become sufficiently narrowed so that the discharge gap remains insulated and no discharge occurs. As a result, as shown in FIG. 3B, even after a lapse of the time T2 from when a discharge induction voltage was applied to the discharge gap, the voltage across the discharge gap does not become equal to or lower the voltage V2. Therefore, when the voltage across the discharge gap is equal to or higher than the voltage V1 after a lapse of the time T1 from application of a discharge induction voltage to the discharge gap and when the voltage across the discharge gap is higher than the voltage V2 after a lapse of the time T2, it is determined that no discharge has occurred and the discharge gap is in the open state.

Subsequently, the waveform of the discharge gap voltage in the short-circuited state will be described. In the short-circuited state, immediately before the discharge induction voltage is applied, the workpiece 12 and the wire electrode 14 are in contact with each other, or chips stagnates between the workpiece 12 and the wire electrode 14. That is, the discharge gap is already in an electrically-connected state before application of a discharge induction voltage, and hence the discharge gap voltage hardly increases even after application of a discharge induction voltage. Therefore, when the voltage across the discharge gap is less than the voltage V1 after a lapse of the time T1 from application of a discharge induction voltage to the discharge gap, it is determined that the discharge gap state is in the short-circuited state.

It should be noted that the voltage V2 may be set to be smaller than the voltage V1 as described above, or the voltage V2 may be set to be equal to the voltage V1.

Machining Current Setting Process

Figure 4:
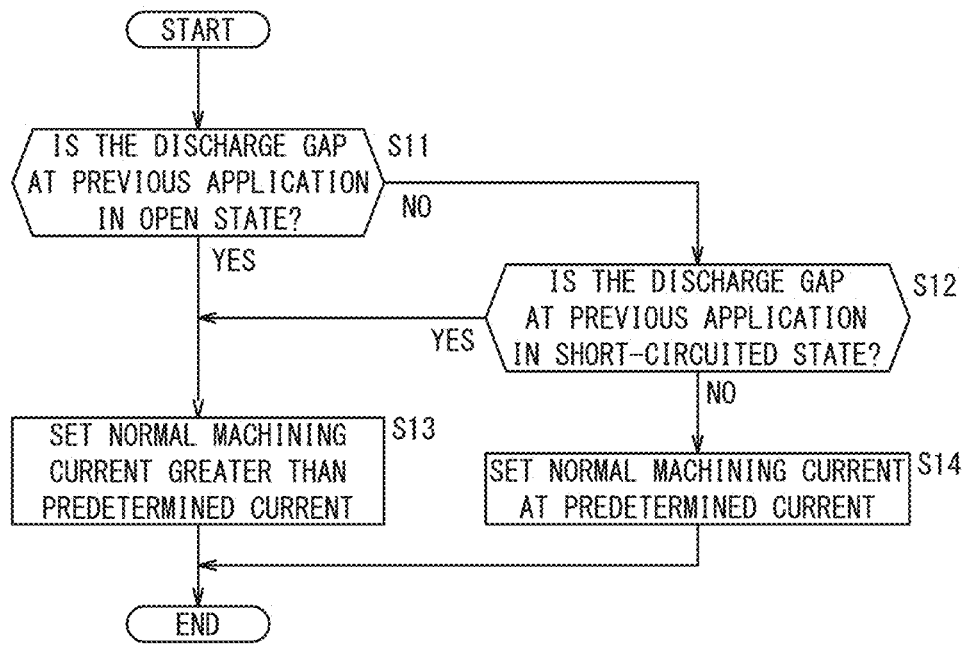
FIG. 4 is a flowchart showing a machining current setting process performed in a machining current setting unit.

FIG. 4 is a flowchart showing a machining current setting process performed in the machining current setting unit 26.

At step S11, the machining current setting unit 26 determines whether or not the discharge gap at the previous application of a discharge induction voltage to the discharge gap is in the open state. When it is in the open state, the process goes to step S13, and when it is not in the open state, the process proceeds to step S12.

At step S12, the machining current setting unit 26 determines whether or not the discharge gap at the previous application of a discharge induction voltage to the discharge gap is in the short-circuited state. When it is in the short-circuited state, the process proceeds to step S13, and when it is not in the short-circuited state (it is in the normal state), the process goes to step S14.

At step S13, the machining current setting unit 26 sets a normal machining current at a value (magnitude) greater than a predetermined current, and ends the machining current setting process.

At step S14, the machining current setting unit 26 sets a normal machining current at the predetermined current, and ends the machining current setting process.

In the flowchart of the machining current setting process performed in the machining current setting unit 26 shown in FIG. 4, when the discharge gap at the previous application of a discharge induction voltage to the discharge gap is in the open state or in the short-circuited state, the machining current setting unit 26 sets a normal machining current to be greater than the predetermined current. However, the machining current setting unit 26 may set a normal machining current at a value greater than the predetermined current when the discharge gap at the previous application of a discharge induction voltage to the discharge gap is in the open state, while the machining current setting unit 26 may set a normal machining current at the predetermined current when the discharge gap at the previous application of a discharge induction voltage to the discharge gap is in the short-circuited state. Alternatively, the machining current setting unit 26 may set a normal machining current at the predetermined current when the discharge gap at the previous application of a discharge induction voltage to the discharge gap is in the open state, while the machining current setting unit 26 may set a normal machining current at a value greater than the predetermined current when the discharge gap at the previous application of a discharge induction voltage to the discharge gap is in the short-circuited state.

Machining Current Control Process

FIG. 5 is a flowchart showing a machining current control process performed in the machining current control unit 30.

At step S21, the machining current setting unit 26 determines whether or not the discharge gap is in the normal state at the present application of a discharge induction voltage to the discharge gap. If it is in the normal state, the process proceeds to step S22, and if not in the normal state, the process goes to step S23.

At step S22, the machining current setting unit 26 controls the main discharge circuit 18 so as to supply the normal machining current to the discharge gap, and ends the machining current control process. The normal machining current supplied to the discharge gap has a magnitude set by the machining current setting unit 26.

At step S23, the machining current setting unit 26 determines whether or not the discharge gap is in the short-circuited state at the present application of a discharge induction voltage to the discharge gap. If it is in the short-circuited state, the process proceeds to step S24, and if it is not in the short-circuited state, the process goes to step S25.

At step S24, the machining current setting unit 26 controls the main discharge circuit 18 so as to supply the short-circuit machining current to the discharge gap, and ends the machining current control process. The short-circuit current supplied to the discharge gap is smaller than the predetermined current.

At step S25, the machining current setting unit 26 controls the main discharge circuit 18 so as not to supply a machining current to the discharge gap, and ends the machining current control process.

About Machining Current

FIG. 6A is a time chart of the discharge gap voltage. FIG. 6B is a time chart of machining current.

As shown in FIGS. 6A and 6B, when the discharge gap at the present application of a discharge induction voltage to the discharge gap is in the normal state and when the discharge gap at the previous application of a discharge induction voltage to the discharge gap was in the open state, a normal machining current greater than the predetermined current is supplied as the machining current to the discharge gap (see the machining current MC1). As a result, it is possible to increase the amount of machining on the workpiece 12 per cycle of main discharging.

As shown in FIGS. 6A and 6B, when the discharge gap at the present application of a discharge induction voltage to the discharge gap is in the normal state and when the discharge gap at the previous application of a discharge induction voltage to the discharge gap was in the short-circuited state, a normal machining current greater than the predetermined current is supplied as the machining current to the discharge gap (see the machining current MC2). As a result, it is possible to increase the amount of machining on the workpiece 12 per cycle of main discharging.

As shown in FIGS. 6A and 6B, when the discharge gap at the present application of a discharge induction voltage to the discharge gap is in the normal state and when the discharge gap at the previous application of a discharge induction voltage to the discharge gap was in the normal state, a normal machining current equal to the predetermined current is supplied as the machining current to the discharge gap (see the machining current MC3). Thereby, it is possible to prevent breakage of the wire electrode 14 caused by main discharging.

As shown in FIGS. 6A and 6B, when the discharge gap at the present application of a discharge induction voltage to the discharge gap is in the short-circuited state, a short-circuit machining current that is smaller than the predetermined current is supplied as the machining current (see the machining currents MC4 and MC5). In this case, by impact at the time of main discharging, the wire electrode 14 can be separated from the workpiece 12, or the chips stagnating between the workpiece 12 and the wire electrode 14 can be removed.

Figure 7A:
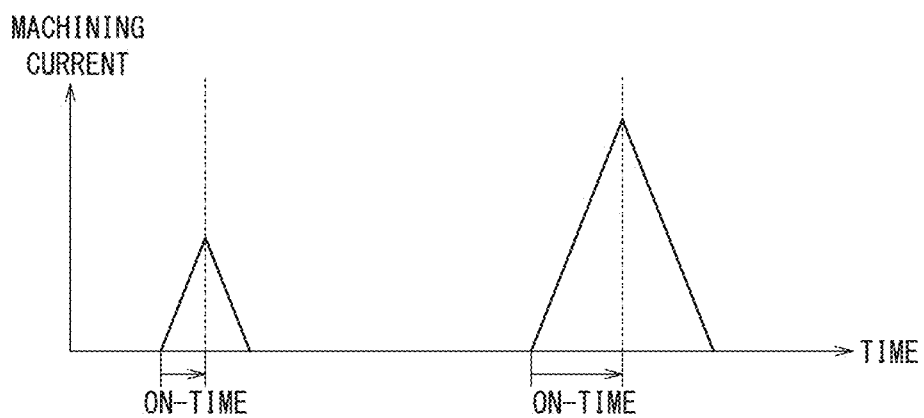
FIGS. 7A and 7B are diagrams illustrating a method for adjusting the magnitude of machining current.
Figure 7B:
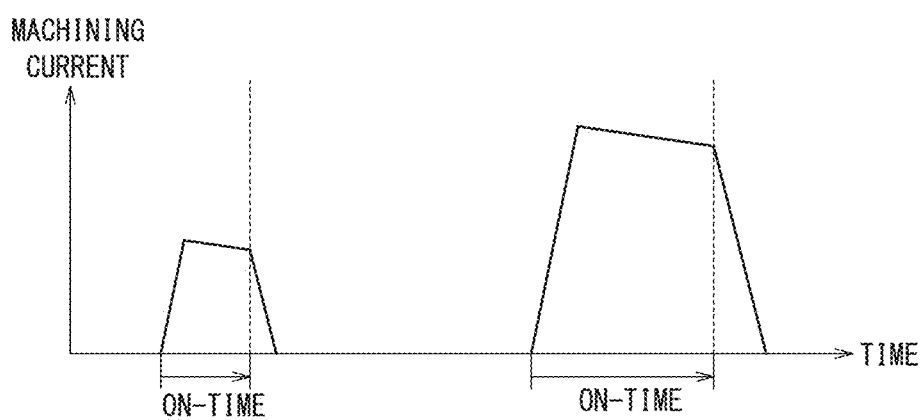

FIGS. 7A and 7B are diagrams for explaining a method of adjusting the magnitude of the machining current. FIG. 7A shows machining current of triangular waves. FIG. 7B shows machining current of trapezoidal waves. The magnitude of the machining current is adjusted by the on-time of an unillustrated switching element in the main discharge circuit 18. In the present embodiment, triangular waves or trapezoidal waves are used as the machining current, but the machining current may use pluses of another waveform.

Operation and Effect

In order to improve the machining speed of the workpiece 12 by the wire electrical discharge machine 10, the machining current may and should be increased. However, if the machining current is increased, the risk of breaking the wire electrode 14 increases.

The applicants hereof focus on the fact that the amount of energy input per unit time to the discharge gap decreases when the discharge gap is in the open state upon application of a discharge induction voltage because no machining current is supplied to the gap. In the wire electrical discharge machine 10 of the present embodiment, the machining current setting unit 26 sets the magnitude of the normal machining current according to the state of the discharge gap that occurred when a discharge induction voltage was applied to the discharge gap at or before the previous time. Specifically, the machining current setting unit 26 sets the normal machining current at a magnitude greater than the predetermined current if the discharge gap at the previous application of a discharge induction voltage to the discharge gap (i.e., at the previous time) is in the open state. Then, when the discharge gap at the present application of a discharge induction voltage to the discharge gap is in the normal state, the machining current control unit 30 controls the main discharge circuit 18 so as to supply the designated normal machining current to the discharge gap. As a result, the time average of the energy input amount can be increased, so that the machining speed at which the workpiece 12 is machined by the wire electrical discharge machine 10 can be improved while the risk of breaking the wire electrode 14 can be reduced.

Further, in the wire electrical discharge machine 10 of the present embodiment, the machining current setting unit 26 sets the magnitude of the normal machining current, based only on the discharge gap state at the previous application of a discharge induction voltage to the discharge gap. This makes it possible to simplify the machining current setting process in the machining current setting unit 26.

Moreover, in the wire electrical discharge machine 10 of the present embodiment, the machining current setting unit 26 sets the normal machining current to be greater than the predetermined current if the discharge gap at the previous application of a discharge induction voltage to the discharge gap is in the short-circuited state. In the case of a short-circuited state when a discharge induction voltage is applied, a short-circuit machining current smaller than the predetermined current is supplied to the discharge gap, so that the amount of energy input per unit time to the discharge gap decreases. When the discharge gap at the previous application of a discharge induction voltage to the discharge gap was in the short-circuited state, the machining current setting unit 26 sets the normal machining current to be greater than the predetermined current. As a result, the time average of the energy input amount can be increased, so that the machining speed at which the workpiece 12 is machined by the wire electrical discharge machine 10 can be improved while the risk of breaking the wire electrode 14 can be reduced.

Second Embodiment

In the first embodiment, the magnitude of the normal machining current is set based only on the discharge gap state at the previous time, i.e., at the time of the previous application of the discharge induction voltage to the discharge gap. However, the magnitude of the normal machining current may be set based on multiple discharge gap states that occurred when discharge induction voltages were applied to the discharge gap earlier In the wire electrical discharge machine 10 of the present embodiment, the machining current setting unit 26 sets the normal machining current to be greater as the number of consecutive times in which the discharge gap was in the open state at the earlier applications of a discharge induction voltage to the discharge gap (i.e., the applications at the previous time and before the previous time) becomes greater.

Figure 8A:
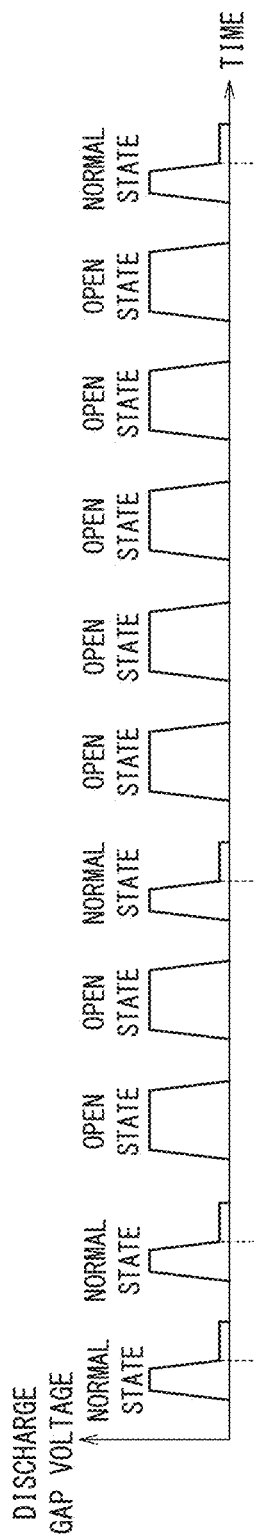
FIG. 8A is a time chart of discharge gap voltage.
Figure 8B:
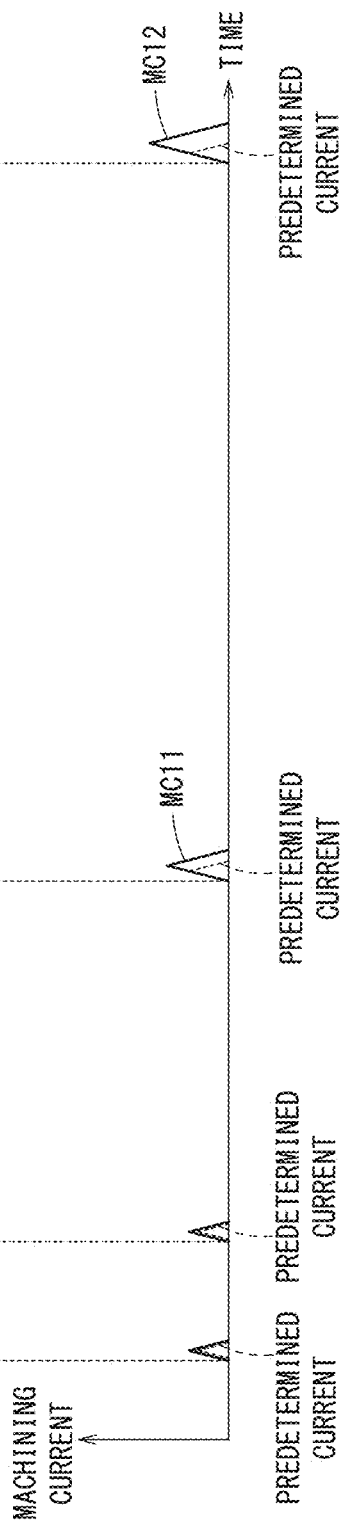
FIG. 8B is a time chart of machining current.

FIG. 8A is a time chart of discharge gap voltage. FIG. 8B is a time chart of machining current. As shown in FIGS. 8A and 8B, compared to the normal machining current in the case where the number of consecutive times in which the discharge gap at the earlier applications was in the open state is two, the normal machining current is set greater when the number of consecutive times in which the discharge gap at the earlier applications was in the open state is five (see the machining currents MC11 and MC12).

Operation and Effect

The greater the number of consecutive times in which the discharge gap was in the open state, the smaller the amount of energy input per unit time to the discharge gap. To deal with this, in the wire electrical discharge machine 10 of the present embodiment, the machining current setting unit 26 increases the normal machining current as the number of consecutive times in which the discharge gap was in the open state at the earlier applications of a discharge induction voltage to the discharge gap (i.e., at the voltage applications at and before the previous time) increases. As a result, the time average of the energy input amount can be increased, so that the machining speed at which the workpiece 12 is machined by the wire electrical discharge machine 10 can be improved while the risk of breaking the wire electrode 14 can be reduced.

Third Embodiment

In the first embodiment, the magnitude of the normal machining current is set based only on the discharge gap state at the previous time, i.e., at the time of the previous application of the discharge induction voltage to the discharge gap. However, the magnitude of the normal machining current may be set based on multiple discharge gap states that occurred when discharge induction voltages were applied to the discharge gap earlier.

In the wire electrical discharge machine 10 of the present embodiment, the machining current setting unit 26 sets the normal machining current to be greater as the number of times in which the discharge gap was in the open state when a discharge induction voltage was applied to the discharge gap a predetermined number of times becomes greater.

FIG. 9A is a time chart of discharge gap voltage. FIG. 9B is a time chart of machining current. As shown in FIGS. 9A and 9B, compared to the normal machining current in the case that the number of times, of a predetermined number of times (e.g., four times) of the earlier applications, in which the discharge gap was in the open state is two, the normal machining current is set greater in the case that the number of times, of the predetermined number of times of the earlier applications, in which the discharge gap was in the open state is three (see machining currents MC21 and MC22).

Operation and Effect

As the number of times, of the predetermined number of the earlier voltage applications, in which the discharge gap was in the open state becomes greater, the amount of energy input per unit time to the discharge gap decreases. To deal with this, in the wire electrical discharge machine 10 of the present embodiment, the machining current setting unit 26 increases the normal machining current as the number of times, of the predetermined number of the earlier voltage applications, in which the discharge gap was in the open state at application of a discharge induction voltage to the discharge gap increases. As a result, the time average of the energy input amount can be increased, so that the machining speed at which the workpiece 12 is machined by the wire electrical discharge machine 10 can be improved while the risk of breaking the wire electrode 14 can be reduced.

Fourth Embodiment

In the wire electrical discharge machine 10 according to the first to third embodiments, the magnitude of the normal machining current is set based on the discharge gap states at previous applications of a discharge induction voltage to the discharge gap. Differing from this scheme, in the wire electrical discharge machine 10 of this embodiment, the machining current setting unit 26 is configured to modify the set normal machining current so as to be greater as the discharge delay time from the start of the present application of a discharge induction voltage to the discharge gap until the occurrence of a discharge spark at the gap becomes longer.

FIG. 10A is a time chart of discharge gap voltage. FIG. 10B is a time chart of machining current. As shown in FIGS. 10A and 10B, when the discharge gap is in the normal state at the previous application of a discharge induction voltage to the discharge gap, the set normal machining current is modified so as to be greater as the discharge delay time from the start of the present application of a discharge induction voltage to the discharge gap until the occurrence of a discharge spark at the gap becomes longer (see the machining currents MC31 and MC32).

As shown in FIGS. 10A and 10B, when the discharge gap is in the open state at the previous application of a discharge induction voltage to the discharge gap, the set normal machining current is modified so as to be greater as the discharge delay time from the start of the present application of a discharge induction voltage to the discharge gap until the occurrence of a discharge spark at the gap becomes longer (see the machining currents MC33 and MC34).

As shown in FIGS. 10A and 10B, when the discharge gap is in the short-circuited state at the previous application of a discharge induction voltage to the discharge gap, the set normal machining current is modified so as to be greater as the discharge delay time from the start of the present application of a discharge induction voltage to the discharge gap until the occurrence of a discharge spark at the gap becomes longer (see the machining currents MC35 and MC36).

Operation and Effect

It is considered that the longer the discharge delay time from the start of application of a discharge induction voltage to the discharge gap until the occurrence of a discharge spark at the discharge gap, the smaller the energy density generated in the discharge gap. Therefore, in the wire electrical discharge machine 10 according to this embodiment, the machining current setting unit 26 modifies the normal machining current so as to be greater as the discharge delay time from the start of the present application of the discharge induction voltage to the discharge gap until the occurrence of a discharge spark at the discharge gap is longer. As a result, the time average of the energy input amount can be increased, so that the machining speed at which the workpiece 12 is machined by the wire electrical discharge machine 10 can be improved while the risk of breaking the wire electrode 14 can be reduced.

Technical Ideas Obtained from the Embodiment

The technical ideas that can be grasped from the above embodiment are described below.

The wire electrical discharge machine (10) for machining a workpiece (12) by generating electric discharge at a discharge gap between the workpiece and a wire electrode (14) includes: a discharge induction circuit (16) configured to apply a discharge induction voltage across the discharge gap; a main discharge circuit (18) configured to supply machining current to the discharge gap; a discharge gap state determination unit (22) configured to determine which state the discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on the voltage across the discharge gap when the discharge induction voltage is applied across the discharge gap; a discharge gap state recording unit (24) configured to record at least one of the normal state, the short-circuited state and the open state as the discharge gap state; a machining current setting unit (26) configured to set the magnitude of a normal machining current depending on the discharge gap state that occurred when the discharge induction voltage was applied to the discharge gap at the previous time or previous times; and a machining current control unit (30) configured to control the main discharge circuit so as to supply the normal machining current to the discharge gap when the discharge gap state at the present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state.

In the above wire electrical discharge machine, the discharge gap state recording unit may be configured to record at least the open state, and the machining current setting unit may be configured to set the normal machining current to be greater than the predetermined current at least when the discharge gap state at the previous time was the open state.

In the above wire electrical discharge machine, the machining current setting unit may be configured to set the magnitude of the normal machining current based only on the discharge gap state at the previous time.

In the above wire electrical discharge machine, the machining current setting unit may be configured to set the normal machining current to be greater as the number of consecutive times in which the discharge gap state was the open state at the applications of the discharge induction voltage to the discharge gap at the previous times becomes greater.

In the above wire electrical discharge machine, the machining current setting unit may be configured to set the normal machining current to be greater as the ratio of the number of times the discharge gap state was the open state, to a predetermined number of times of the previous voltage applications to the discharge gap becomes greater.

In the above wire electrical discharge machine, the discharge gap state recording unit may be configured to record at least the short-circuited state, and the machining current setting unit may be configured to set the normal machining current to be greater than the predetermined current at least when the discharge gap state at the previous time was the short-circuited state.

In the above wire electrical discharge machine, the machining current setting unit may be configured to modify the normal machining current so as to be greater as the discharge delay time from start of the present application of the discharge induction voltage to the discharge gap until occurrence of electric discharge at the discharge gap becomes longer.

In a control method of controlling a wire electrical discharge machine (10) machining a workpiece (12) by generating electric discharge at a discharge gap between the workpiece and a wire electrode (14), the wire electrical discharge machine includes: a discharge induction circuit (16) configured to apply a discharge induction voltage across the discharge gap; and a main discharge circuit (18) configured to supply machining current to the discharge gap, and the control method includes: a discharge gap state determining step of determining which state the discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on the voltage across the discharge gap when the discharge induction voltage is applied across the discharge gap; a discharge gap state recording step of recording at least one of the normal state, the short-circuited state and the open state as the discharge gap state; a machining current setting step of setting a magnitude of a normal machining current depending on the discharge gap state that occurred when the discharge induction voltage was applied to the discharge gap at the previous time or previous times; and a machining current controlling step of controlling the main discharge circuit so as to supply the normal machining current to the discharge gap when the discharge gap state at a present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state.

The above control method of controlling the wire electrical discharge machine may be configured such that the discharge gap state recording step records at least the open state, and the machining current setting step sets the normal machining current to be greater than the predetermined current at least when the previous discharge gap state at the previous time was the open state.

The above control method of controlling the wire electrical discharge machine may be configured such that the machining current setting step sets the magnitude of the normal machining current based only on the discharge gap state at the previous time.

The above control method of controlling the wire electrical discharge machine may be configured such that the machining current setting step sets the normal machining current to be greater as the number of consecutive times in which the discharge gap state was the open state at the applications of the discharge induction voltage to the discharge gap at the previous times becomes greater.

The above control method of controlling the wire electrical discharge machine may be configured such that the machining current setting step sets the normal machining current to be greater as the ratio of the number of times the discharge gap state was the open state, to a predetermined number of times of the previous voltage applications to the discharge gap becomes greater.

The above control method of controlling the wire electrical discharge machine may be configured such that the discharge gap state recording step records at least the short-circuited state, and the machining current setting step sets the normal machining current so as to be greater than the predetermined current at least when the discharge gap state at the previous time was the short-circuited state.

The above control method of controlling the wire electrical discharge machine may be configured such that the machining current setting step modifies the normal machining current so as to be greater as the discharge delay time from start of the present application of the discharge induction voltage to the discharge gap until occurrence of electric discharge at the discharge gap becomes longer.

The present invention is not particularly limited to the embodiments described above, and various modifications are possible without departing from the essence and gist of the present invention.

What is claimed is:

1. A wire electrical discharge machine for machining a workpiece by generating electric discharge at a discharge gap between the workpiece and a wire electrode, comprising:
    a discharge induction circuit configured to apply a discharge induction voltage across the discharge gap;
    a main discharge circuit configured to supply machining current to the discharge gap;
    means for determining which state a discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on a voltage across the discharge gap when the discharge induction voltage is applied across the discharge gap;
    means for recording at least one of the normal state, the short-circuited state and the open state as the discharge gap state;
    means for setting a magnitude of a normal machining current depending on the discharge gap state that occurred when the discharge induction voltage was applied to the discharge gap at a previous time or previous times; and
    means for controlling the main discharge circuit so as to supply the normal machining current to the discharge gap when the discharge gap state at a present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state wherein the means for setting sets the magnitude of the normal machining current based only on the discharge gap state at the previous time.

2. The wire electrical discharge machine according to claim 1, wherein:
    the means for recording records at least the open state; and
    the means for setting sets the normal machining current to be greater than the predetermined current at least when the discharge gap state at the previous time was the open state.

3. A wire electrical discharge machine for machining a workpiece by generating electric discharge at a discharge gap between the workpiece and a wire electrode, comprising:
    a discharge induction circuit configured to apply a discharge induction voltage across the discharge gap;
    a main discharge circuit configured to supply machining current to the discharge gap;
    means for determining which state a discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on a voltage across the discharge gap when the discharge induction voltage is applied across the discharge gap;
    means for recording at least one of the normal state, the short-circuited state and the open state as the discharge gap state;
    means for setting a magnitude of a normal machining current depending on the discharge gap state that occurred when the discharge induction voltage was applied to the discharge gap at a previous time or previous times; and
    means for controlling the main discharge circuit so as to supply the normal machining current to the discharge gap when the discharge gap state at a present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state, wherein the means for setting sets the normal machining current to be greater as a number of consecutive times in which the discharge gap state was the open state at the applications of the discharge induction voltage to the discharge gap at the previous times becomes greater.

4. The wire electrical discharge machine according to claim 1, wherein the means for setting sets the normal machining current to be greater as a ratio of a number of times the discharge gap state was the open state, to a predetermined number of times of the previous voltage applications to the discharge gap becomes greater.

5. The wire electrical discharge machine according to claim 1, wherein:
the means for recording records at least the short-circuited state; and
the means for setting sets the normal machining current to be greater than the predetermined current at least when the discharge gap state at the previous time was the short-circuited state.

6. The wire electrical discharge machine according to claim 1, wherein the means for setting modifies the normal machining current so as to be greater as a discharge delay time from start of the present application of the discharge induction voltage to the discharge gap until occurrence of electric discharge at the discharge gap becomes longer.

7. A control method of controlling a wire electrical discharge machine machining a workpiece by generating electric discharge at a discharge gap between the workpiece and a wire electrode, the wire electrical discharge machine comprising: a discharge induction circuit configured to apply a discharge induction voltage across the discharge gap; and a main discharge circuit configured to supply machining current to the discharge gap,
the control method comprising:
a discharge gap state determining step of determining which state a discharge gap state is when the discharge induction voltage is applied across the discharge gap, among a normal state in which electric discharge occurs at the discharge gap, a short-circuited state in which the discharge gap is short-circuited and an open state in which no current flows through the discharge gap, based on a voltage across the discharge gap when the discharge induction voltage is applied across the discharge gap;
a discharge gap state recording step of recording at least one of the normal state, the short-circuited state and the open state as the discharge gap state;
a machining current setting step of setting a magnitude of a normal machining current depending on the discharge gap state that occurred when the discharge induction voltage was applied to the discharge gap at a previous time or previous times; and
a machining current controlling step of controlling the main discharge circuit so as to supply the normal machining current to the discharge gap when the discharge gap state at a present application of the discharge induction voltage is the normal state, control the main discharge circuit so as to supply a short-circuit machining current smaller than a predetermined current to the discharge gap when the discharge gap state at the present application thereof is the short-circuited state, and control the main discharge circuit so as not to supply any machining current to the discharge gap when the discharge gap state at the present application thereof is the open state, wherein the machining current setting step sets the magnitude of the normal machining current based only on the discharge gap state at the previous time.

8. The control method of controlling the wire electrical discharge machine according to claim 7, wherein:
the discharge gap state recording step records at least the open state; and
the machining current setting step sets the normal machining current to be greater than the predetermined current at least when the discharge gap state at the previous time was the open state.

9. The control method of controlling the wire electrical discharge machine according to claim 8, wherein the machining current setting step sets the normal machining current to be greater as a ratio of a number of times the discharge gap state was the open state, to a predetermined number of times of the previous voltage applications to the discharge gap becomes greater.

10. The control method of controlling the wire electrical discharge machine according to claim 7, wherein:
the discharge gap state recording step records at least the short-circuited state; and
the machining current setting step sets the normal machining current to be greater than the predetermined current at least when the discharge gap state at the previous time was the short-circuited state.

11. The control method of controlling the wire electrical discharge machine according to claim 7, wherein the machining current setting step modifies the normal machining current so as to be greater as a discharge delay time from start of the present application of the discharge induction voltage to the discharge gap until occurrence of electric discharge at the discharge gap becomes longer.

* * * * *